Figure 1:
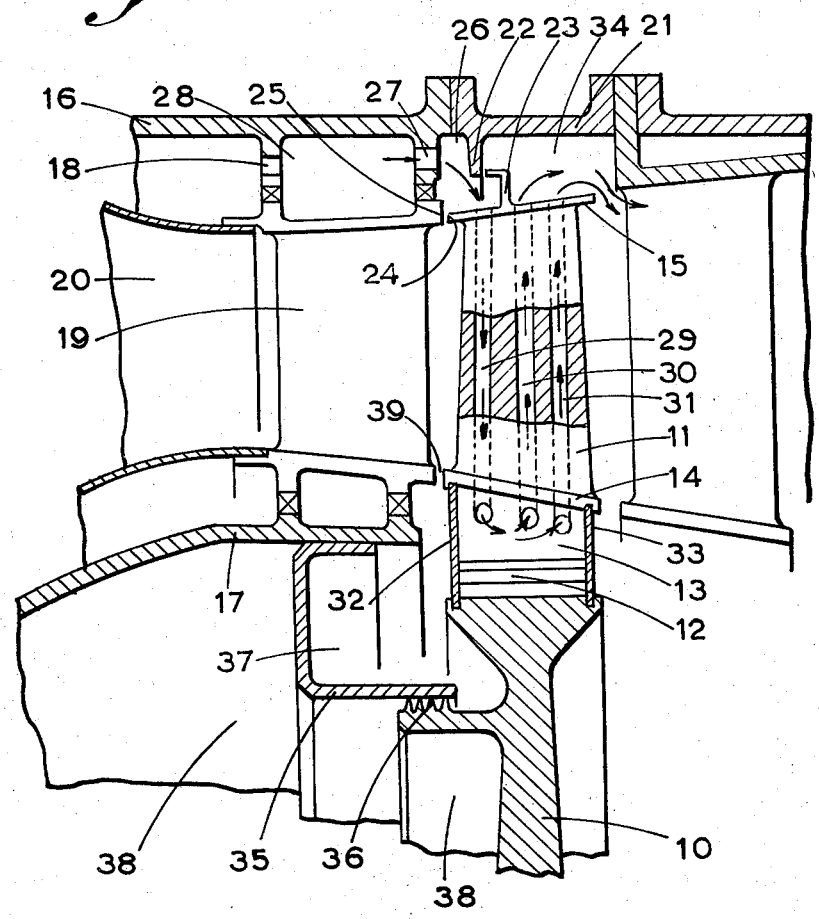

July 19, 1960   J. A. PETRIE   2,945,671
BLADED ROTOR CONSTRUCTIONS FOR FLUID MACHINES
Filed Jan. 30, 1956   2 Sheets-Sheet 1

INVENTOR
James Alexander Petrie
BY
ATTORNEYS

INVENTOR
JAMES ALEXANDER PETRIE

United States Patent Office 2,945,671
Patented July 19, 1960

2,945,671
BLADED ROTOR CONSTRUCTIONS FOR FLUID MACHINES

James Alexander Petrie, Littleover, Derby, England, assignor to Rolls-Royce Limited, Derby, England, a British company Filed Jan. 30, 1956, Ser. No. 562,313

Claims priority, application Great Britain Feb. 10, 1955

8 Claims. (Cl. 253—39.15)

This invention relates to bladed rotor constructions for fluid machines, for instance axial flow turbines and/or compressors, which constructions are of the kind (hereinafter referred to as "the kind specified") in which fluid is passed through passages in the blades of the construction for cooling or heating purposes.

According to the present invention a bladed construction of the kind specified comprises a plurality of rotor blades mounted in a rotor disc and providing a circumferentially-extending gas-flow-defining surface at the blade tips, said flow-defining surface co-operating with stationary structure to provide a space between said structure and said bladed rotor into which fluid is introduced under pressure, and wherein the blades are formed each with at least one lengthwise passage communicating with said space and exhausting to a low-pressure location, whereby the fluid passes at least radially inwards through said blades.

Preferably the flow-defining surface is constituted by shroud formations at the blade tips which in the assembly constitute an annular surface. Alternatively, in certain constructions such annular surface may be provided by one or more sections welded to the blade tips.

According to a feature of the invention at least two lengthwise passages are formed in a blade and are interconnected at the root end of the blade, whereby fluid flows radially inwards through the blade and thereafter radially outwards, exhausting to a space beyond the flow-defining surface. In one preferred embodiment of the invention a single passage is provided through which fluid flows radially inwards, and two or more passages are provided through which fluid flows radially outwards before exhausting to the low-pressure location.

According to a further feature of the present invention the blades are mounted in the rotor disc by root fixings which connect with the root portion of the blade proper through elongated stems, there being platform formations on the blades at the junction of the stems and blade proper which in assembly constitute an annular gas-flow-defining surface. With a bladed rotor of this construction intervening spaces or channel formations are constituted between the stems of adjacent blades, and such channel formations may provide passages for exhausting the fluid flow from the rotor assembly or alternatively providing intercommunication between first delivery passages in the blades and further exhaust passages in the blades. For the purpose of sealing the channel formations end blanking plates are preferably supported on the rotor assembly thus to provide substantially gas-tight chambers.

Arrangements according to the present invention may present advantages over hitherto known constructions in which fluid is passed through passages in the blades from the radially inner ends thereof; thus in certain constructions of the latter arrangement it has been the practice to feed the fluid through passages formed in a disc supporting the blades, such passages being formed in a highly stressed part; a further advantage which is presented by constructions according to the present invention is that the cooling fluid supply may be readily controlled, whereby for example it may be reduced under low power running conditions of the engine.

A preferred embodiment of the invention as applied to axial flow turbine of a gas-turbine engine is diagrammatically illustrated in Figure 1 of the accompanying drawing.

Figure 2:
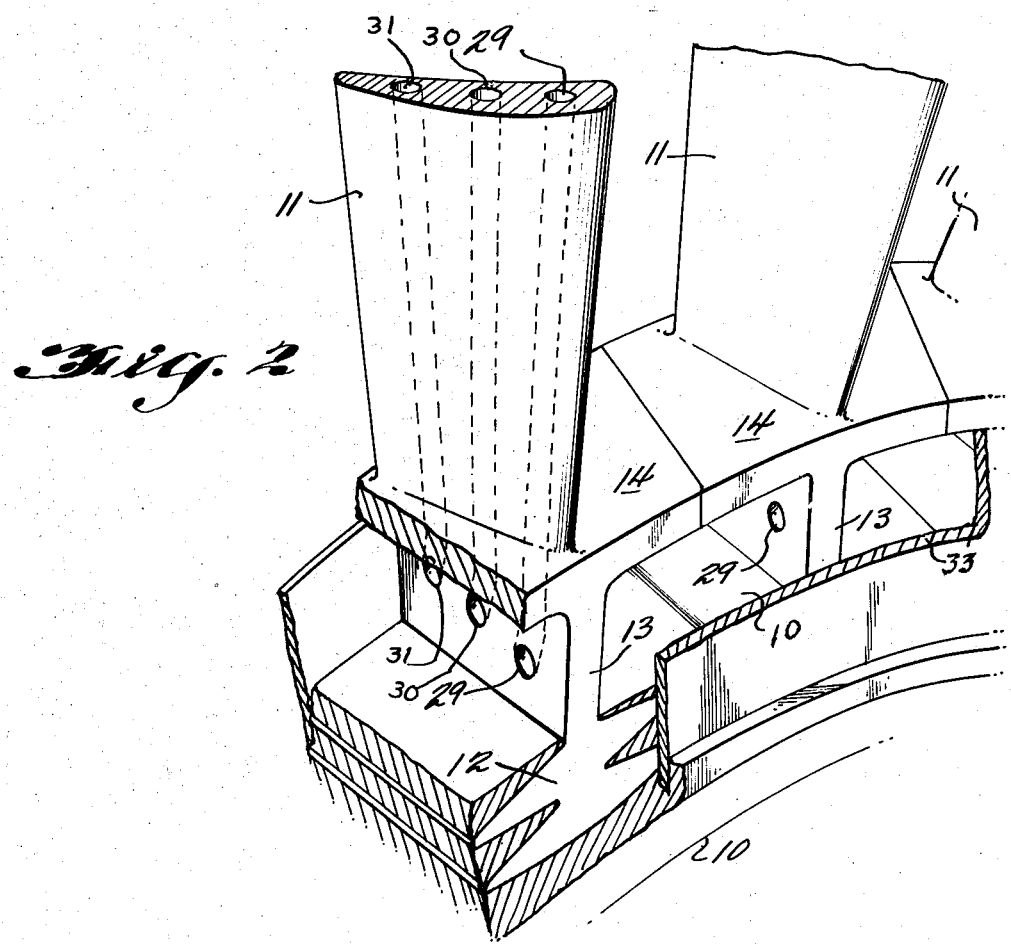

Figure 2 is a perspective view in fragment of the blade roots showing the passages entering the intervening spaces.

Referring to the figures, the turbine rotor disc is shown at 10 and mounts a plurality of blades, the airfoil portion of one of which is shown at 11, by means of fir-tree root fixings 12. These fir-tree root fixings are received in peripheral axially directed broaching on the disc 10.

A fir-tree root fixing 12 connects with the root end of the airfoil portion of the blade proper by means of an elongated stem 13, there being a platform 14 at the junction between the airfoil portion and stem. The platforms of the assembly of blades constitute in known manner an annular gas-flow-defining surface at the root ends of the blades.

Likewise a shroud 15 is formed at the tip of the blade, and again the assembly of shrouds provides a radially outer gas-flow defining surface to the blade assembly.

The turbine rotor described is supported in radially outer stationary turbine structure generally indicated at 16 and radially inner stationary turbine structure generally indicated at 17. Inlet guide vane stationary turbine blading 19 extends between the stationary turbine structures 16 and 17 and heated gas enters the turbine system through duct 20.

The radially outer stationary turbine structure 16 comprises a stationary ring member 21 on which there is formed a radially inwardly directed flange 22. This flange co-operates with a radially outward extending feature 23 on the blade shrouds 15 to provide with the flange 20 an axially directed gas seal. Likewise an axial extension 24 on the shroud 15 co-operates with surface 25 formed on the inlet guide vane blades 19 constituting a further gas seal. There is thus provided an annular space 26 into which air is introduced through passage 27 from a pressurised chamber 28. The chamber 28 is connected through porting 18 to the tertiary air space of the combustion equipment of the engine, i.e. to the space between the flame tube and air casing of said equipment which receives air from the compressor of the engine. Air thus tapped from the tertiary air space is normally sufficiently cool for turbine cooling purposes.

In the construction illustrated each turbine blade 11 is formed with a lengthwise extending passage 29 towards its leading edge and with two further passages 30 and 31 respectively at mid-section and towards the trailing edge. The passage 29 communicates with the annular space 26, whereby cooling air can flow from this space into the passage 29 in the radially inward direction.

Channel spaces are formed between stems 13 of adjacent blades, and annular blanking plates 32 and 33 seal the ends of the channel formations, with which the passages 29, 30 and 31 communicate. Thus air having passed through the passage 29 exhausts through passages 30 and 31 of extended capacity into the low pressure space 34 on the righthand side of the radial flange formation 23. Cooling gas then passes, as indicated by the arrows, into the gas-flow on the downstream side of the turbine.

The radially inner stationary turbine structure 17 comprises an annular member 35 providing a gas seal with an axial flange 36 on the turbine rotor 10. There is thus constituted a space 37 which is pressurised by leakage through seal 36 from the space 38, which latter space is pressurised by a tapping from the tertiary air space of the combustion equipment or from the air compressor, thus to provide a flow through the seal clearance 39 between the blade platform 14 and radially inner stationary turbine structure 17. The pressure in the chamber 37 is preferably chosen to be in excess of that of the channel formations between the stems 13, whereby loss of cooling air is avoided.

What I claim is:

1. A bladed rotor and housing construction for a gas turbine engine including in combination; a rotor disc, a plurality of rotor blades radially disposed about the periphery of the disc and having airfoil portions provided with tips, a circumferentially extending, gas-flow confining annular shroud mounted on the blade tips, stationary structure on said housing radially spaced from and co-operating with said shroud so as to provide an annular chamber between the structure and the shroud, duct means in communication with said chamber for introducing cooling fluid under pressure thereto, a low pressure chamber downstream of said stationary structure which co-operates with the shroud to form the annular chamber, root fixings securing the blades to the disc, an elongated stem connecting each blade airfoil portion to the root fixing, a platform at the junction of each airfoil portion and its stem, said platforms abutting to constitute a gas-flow defining annulus and said stems being spaced apart circumferentially to provide intervening axially extending spaces beneath said annulus, said blades being formed each with at least one lengthwise passage having its outer end terminating at said annular shroud and communicating with said annular chamber and its inner end terminating at and communicating with one of said intervening spaces, and means on each blade fluidly connecting said intervening spaces to said low pressure chamber.

2. The construction as claimed in claim 1 in which additional lengthwise passages are formed in each blade opening into said intervening space, said intervening space connecting the passages at the fixing end of said blades, and said additional passages having their outer ends communicating with said low pressure chamber and forming extended capacity means connecting one of said intervening spaces to said low pressure chamber, whereby fluid flows inwardly through the first blade passage and thereafter radially outwardly to exhaust in said low pressure chamber.

3. A construction as claimed in claim 1 having annular end blanking plates supported by the rotor and each engaging the axial ends of all of the blade stems and abutting the platforms and rotor side faces to seal the intervening spaces to provide substantially gastight separate chambers.

4. The construction as claimed in claim 1 in which the airfoil portion of each blade has a shroud formation at its tip extending axially and circumferentially so that adjacent shroud formations abut at their ends to form the flow confining annular shroud.

5. The construction as claimed in claim 1 in which an additional lengthwise passage is formed in each blade opening into said intervening space, said intervening space connecting the passages together at the fixing end of said blades, and said additional passage having its outer end communicating with said low pressure chamber and forming the means connecting one of said intervening spaces to said low pressure chamber, whereby fluid flows inwardly through the first blade passage and thereafter radially outwardly to exhaust in said low pressure chamber.

6. A construction as claimed in claim 5 for cooling the turbine blades of a gas turbine engine having a radial extension from the gas-flow-defining surface at each blade tip which co-operates with the stationary structure to divide said annular space into two spaces beyond the blade tips into one of which said fluid is delivered under pressure to flow radially inwards through the blade and the other from which said gas is exhausted and which communicates with said low pressure chamber downstream of the radial extensions.

7. A construction as claimed in claim 1 applied to cool the turbine blades of a gas turbine engine in which the cooling fluid is obtained from that flowing through the engine from the compressor thereof.

8. A construction as claimed in claim 6 in which the cooling fluid is led off from an air space of the engine.

References Cited in the file of this patent

UNITED STATES PATENTS

| | | |
|---|---|---|
| 2,685,429 | Auyer | Aug. 3, 1954 |

FOREIGN PATENTS

| | | |
|---|---|---|
| 57,013 | France | Aug. 6, 1952 |
| | (Addition to No. 997,219) | |
| 491,738 | Germany | Feb. 12, 1930 |
| 701,154 | Great Britain | Dec. 16, 1953 |
| 1,090,194 | France | Oct. 13, 1954 |

OTHER REFERENCES

Saldin: (Abstract of application Ser. No. 3,040, published April 10, 1951—645 O.G. 680).